May 5, 1953     A. B. STOTTER     2,637,617
RECEPTACLE FOR BAKERY PRODUCTS
Filed Jan. 3, 1950
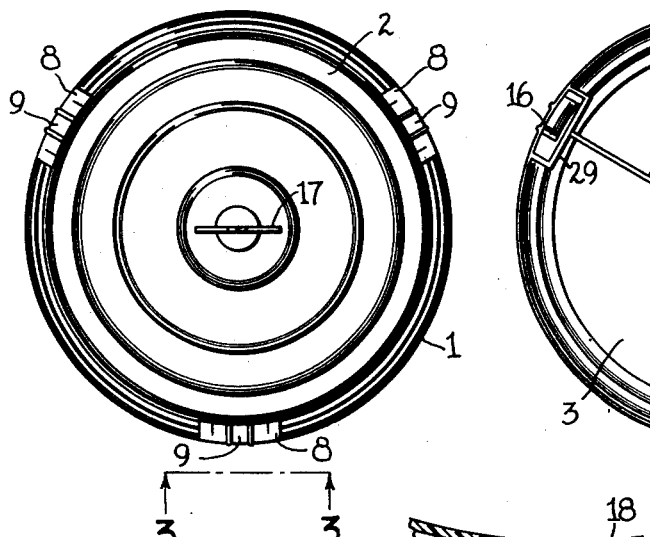
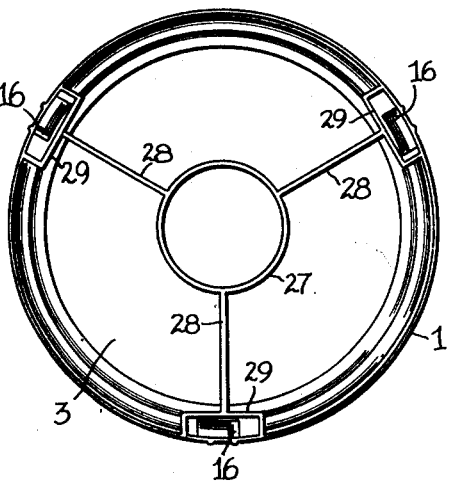
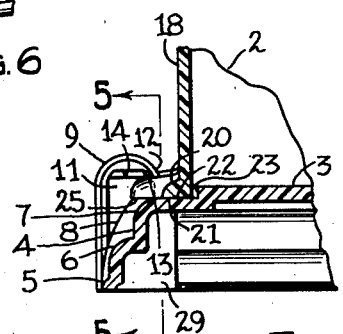
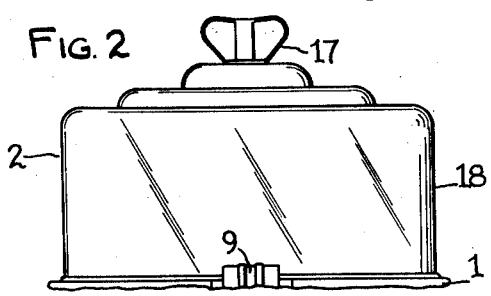
*INVENTOR.*
ALFRED B. STOTTER
BY William Isler
ATTORNEY.

Patented May 5, 1953

2,637,617

UNITED STATES PATENT OFFICE 2,637,617

RECEPTACLE FOR BAKERY PRODUCTS

Alfred B. Stotter, Cleveland Heights, Ohio, assignor to Transparent Specialties Corporation, Cleveland, Ohio, a corporation of Ohio Application January 3, 1950, Serial No. 136,536

5 Claims. (Cl. 312—284)

This invention relates, as indicated, to a cake saver and holder.

A primary object of the invention is to provide an article of the character described, which, in addition to its cake saver function, is designed to be transported from one location to another, without the necessity of using both hands to maintain the parts thereof in assembled relation.

Another object of the invention is to provide an article of the character described, having means for facilitating carrying of the base and cover thereof as a unit, by a simple pick-up action.

A further object of the invention is to provide an article of the character described, having novel bayonet locking means for interlocking the base and cover to each other.

A further object of the invention is to provide an articles of the character described, in which the bayonet locking means comprises yieldable components, whereby a more efficient and more effective locking action is effected upon interlocking of the base and cover.

A still further object of the invention is to provide an articles of the character described, the base of which is also adapted to function as a relish dish or the like.

Other objects and advantages of the invention will be apparent during the course of the following description.

In the accompanying drawings, forming a part of this specification, and in which like numerals are employed to designate like parts throughout the same, Fig. 1 is a top plan view of the cake saver and holder;

Fig. 2 is a side elevational view of the cake saver and holder;

Fig. 3 is a fragmentary side elevational view, as indicated by the arrows 3—3 of Fig. 1;

Fig. 4 is a fragmentary cross-sectional view, taken on the line 4—4 of Fig. 3;

Fig. 5 is a fragmentary cross-sectional view, taken on the line 5—5 of Fig. 4;

Fig. 6 is a fragmentary plan view, showing one of the locking lugs of the cover;

Fig. 7 is a fragmentary cross-sectional view taken through the line 7—7 of Figure 3, and Fig. 8 is a bottom plan view of the base of the cake saver and holder.

Referring more particularly to the drawings, the cake saver and holder will be seen to comprise a base, generally designated by reference numeral 1, and a cover, generally designated by numeral 2, each being preferably molded, in a single piece, from a plastic.

The base 1 has an upper central portion 3 of fairly large diameter, and a downwardly-extending flange 4 consisting of portions 5, 6 and 7 of arcuate cross-section, in terrace-like arrangement.

At peripherally-spaced points, the base 1 is provided with protuberant portions 8 which extend radially to the flange 4 and are formed intermediate their ends with upstanding locking elements 9, which extend vertically to points above the level of the central portion 3 of the base 1. The elements 9 are hollow, and are closed at one end, as by a wall 10, but are left open, at the other end, to provide an opening 11 for a purpose to be presently described and the elements may be referred to as female elements. The radially-inner wall 12 of each of the elements 9 has portions thereof removed to provide an edge 13 which slopes downwardly from the end thereof adjacent the opening 11 to a point 14. Beyond the point 14, the edge 13 is of inverted arcuate shape, as at 15, this edge 15 being also the radially-inner end of recess 16 in the upper wall of the element 9, which recess serves a purpose to be presently described. The cross-sectional contour of the recess 16 is the same as the contour of the edge 15. The edge 13 and the edge 15 together form an upper inner wall of the slot or recess extending from opening 11 to wall 10. This upper inner wall is in effect a ledge overhanging an open space therebelow as seen in the views of the drawing.

The cover 2 is of dome-like form, and has secured to the central top portion thereof a plastic handle 17, which is of such design as to facilitate picking the cake saver and holder up by means of the fingers, when the cake saver and holder is to be transported. The cover, as previously stated, is molded from a plastic, and has a vertical cylindrical side wall 18, which terminates at its lower edge in an annular bead 19, which has an upper face 20 of arcuate cross-section, and a flat lower face 21, which is adapted to rest on the upper flat surface 22 of the portion 7 of the flange 4. The junction of the surface 22 with the flat surface 3 of the base forms an annular shoulder 23, which aids in centralizing or centrally locating the cover with respect to the base.

At points spaced to correspond with the spacing of the elements 9, the bead 19 is provided with protuberances, lugs or male elements 24 (Fig. 6) which extend radially outwardly from the bead and have flat lower surfaces 25 which are coplanar with the surfaces 21 of the bead 19. The protuberances 24 have raised portions 26 at their leading ends, which, as shown in Fig. 5, have upper surfaces which are transversely crowned to correspond with the curvature of the recesses 16.

When the device is to be used as a cake saver, the cake is placed on the base 1, and the cover 2 is placed thereover, with the surface 21 of the bead resting on the surface 22 of the base, and without regard to the position of the protuberances 24 with respect to the elements 9.

When, however, it is desired to transport the cake, as when carrying it to a picnic or the like, the cover 2 is rotated relatively to the base, in a counter-clockwise direction, as viewed in Fig. 1, so as to cause the protuberances, lugs or male elements 24 to enter the openings 11 and into the slots or recesses of the elements 9. The rotation is continued until the portions 26 of the protuberances, lugs or male elements 24 come into abutment with the walls 10 of the elements 9. In the initial stages of this movement, the portions 26 wedgingly engage the sloping edges 13 of the elements 9, but due to the flexibility or resiliency of the elements 9, these elements yield slightly during such movement. After the portions 26 pass the points 14, the protuberances snap into the recesses 16 due to the fact that the stressed elements 9, being thus relieved of stress, resume their original unstressed condition, with the result that the protuberances are, in effect, locked or latched to the elements 9. In the interlocked position of the male and female elements, the upper surface of each of the male elements is adjacent the ledge or upper inner wall of the respective elements, but the lower surface of the male element overhangs an open space. Thus, the male elements are not squeezed or wedged between opposing surfaces but merely hook or engage under the ledge or upper inner wall of the respective female elements as seen in the drawing.

With the cover thus locked or latched to the base, the cover and base may be transported, as a unit, to any desired location, by simply picking up the unit by means of the handle 17. The upper surface of each male element engages the overhanging ledge of the respective female element to support the base and its load as the interconnected cover and base are lifted by the handle.

The locking or latching engagement between the cover and base is, however, not sufficiently strong to prevent unlocking of the cover from the base by reverse rotation of the cover by ordinary manual force. It is obvious from the drawing that there is no friction encountered by the lower surface of the male elements at the location within the female elements as the cover is rotated.

As shown in Figs. 3, 4 and 8, the base 1 is provided on its lower surface with a central circular rib 27 and a plurality of ribs 28 extending radially from the rib 27 to U-shaped ribs 29, which interconnect the ribs 28 with the flange 4 of the base. These ribs 27, 28 and 29 serve to reinforce or rigidify the base 1. These ribs, however, serve an additional purpose, that is to say, when the base is inverted, the ribs form compartments for relishes, etc., thus permitting the base to be used as a relish dish or the like.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

Having thus described my invention, I claim:

1. A cake holder comprising in combination a base, said base having an annular shoulder spaced inwardly from the edge thereof, said base outwardly of said annular shoulder having a flat annular surface, a plurality of female locking elements carried by said base adjacent the edge thereof and arranged at substantially equidistant intervals around the said base, said annular shoulder and said locking elements defining limits of a circular pathway on said flat annular surface, each of said locking elements having a slot extending from a side thereof and disposed substantially circumferentially of said base, each of said locking elements having an upper inner wall disposed radially outward of said flat annular surface and disposed in a plane above the plane of said flat annular surface and defining the upper boundary of the slot of the respective locking element, each said locking element being open at the level of said flat annular surface, each of said elements having a radially extending stop portion at the inner end of each said slot to form a positive stop within the respective locking element, a cover supported on said base and adapted to enclose a cake supported on said base, said cover having an annular beaded edge portion adapted to engage and rest upon the said flat annular surface of said base and to be revolved in said circular pathway, the maximum diameter of said beaded edge portion substantially coinciding with the maximum diameter of said flat annular surface of the base, and a plurality of lug elements carried by said cover and extending radially outward from said beaded edge portion, said lug elements being arranged at substantially equidistant intervals around the said cover, said lug elements corresponding in number and arrangement with the female locking elements carried by said base, each said lug element having a radially extending abutting surface adapted to abut a stop portion of said respective locking element, each said lug element extending radially outward beyond said flat annular surface of said base supporting said cover and in circumferential alignment with the slot of a respective locking element, each said lug element being positionable in the said slot of a respective locking element under said upper wall and substantially clear of contact at the level of said annular surface under said upper wall, the arrangement of said base, locking elements, cover and lug elements being such that the cover and base may be interlocked by revolving said beaded edge portion of the cover on said flat annular surface guided in said circular pathway in a direction to move said lug elements into the slots of the respective locking elements to abut the abutting surfaces of the lug elements against the stop portions of the respective locking elements and to position the lug elements under said upper walls for interlocking the cover and base against axial disengagement without substantially subjecting said lug elements to opposed pressures in an axial direction.

2. A cake holder comprising in combination a base, said base having an annular shoulder spaced inwardly from the edge thereof, said base outwardly of said annular shoulder having a flat annular surface, said annular shoulder providing a circular upright guide adjacent said flat annular surface, a plurality of locking elements carried by said base adjacent and radially outward of said flat annular surface at a radial distance from said annular shoulder and spaced from each other around said base, each of said locking elements having a slot extending from a side thereof and disposed in a direction substantially circumferential of said base, said slot having an upper wall disposed radially outward of, and above the plane of, said flat annular surface, each said locking element having an open space extending from the said upper wall of the respective locking element downwardly to below the plane of said flat annular surface, a cover supported on said base and adapted to enclose a cake supported on said base, said cover having an annular edge portion adapted to engage and rest upon the said flat annular surface and to be revolved in the guided path provided by said annular shoulder, and a plurality of lug elements carried by said cover and extending radially outward therefrom adjacent said edge portion, said lug elements being spaced from each other around the said cover, said lug elements corresponding in number and arrangement with the locking elements carried by said base, said lug elements extending radially outward beyond said flat annular surface of the said base supporting said cover in circumferential alignment with the slot of a respective locking element, said lug elements being positionable in the slots under said upper wall and over said open space of the respective locking elements, the arrangement of the said base, locking elements, cover and lug elements being such that said cover upon being positioned with said edge portion adjacent said flat annular surface for guidance by said annular shoulder may be revolved to move said lug elements in a path outwardly of said flat annular surface and circumferentially into the slots of the respective locking elements to position the respective lug elements under the said upper walls and over the open spaces of the locking elements to connect said base and cover together against separation in an axial direction.

3. A cake holder comprising in combination a base, said base having an annular upright wall disposed adjacent the edge thereof, said base having a flat annular surface adjoining the bottom of said wall and a downwardly extending flange portion disposed radially outward of said flat annular surface, said wall providing a circular upright guide adjacent said flat annular surface, a cover supported on said base and adapted to enclose a cake supported on said base, said cover having a downwardly extending annular edge portion adapted to engage said flat annular surface adjacent said upright wall and to be guided in a circular path by said wall, and a plurality of interlocking couples for locking said base and cover together and holding said annular edge portion adjacent to said flat annular surface and upright wall, said couples being disposed radially outward from the outer circumference of said flat annular surface, each of said couples comprising a base-carried element and a cover-carried element, said base-carried element having an upwardly extending outer wall disposed at a radial distance from said flat annular surface and extending from said flange portion to a location above the level of said flat annular surface and having an upper wall extending radially inward from said outer wall and disposed above the level of, and radially outward of, said flat annular surface, said base-carried element having an open space extending downwardly from said upper wall and below the level of said flat annular surface, said cover-carried element being extended radially outward from the flat annular surface of said base and out above the level of said flange portion, said elements being formed for insertion of one within the other upon lateral movement of one element relative to the other element, said elements being adapted to interlock the base and cover together against axial disengagement upon lateral movement of one element relative to the other element during revolving in one direction of one of said base and cover relative to the other, said cover-carried element being disposed below said upper wall and radially inward of said outer wall and above said open space of the respective base-carried element upon insertion of one element within the other to interengage said elements without substantial engagement of the lower surface of said cover-carried element by said base-carried element, said couples being spaced apart around the base and cover and being disposed radially outward of said edge portion of the cover and radially outward of said annular upright wall of the base and of said flat annular surface.

4. A cake holder comprising in combination a base, said base having a peripheral portion extending therearound, said peripheral portion comprising an annular flat surface portion and an annular guide portion adjacent said flat surface portion, a cover having a downwardly extending skirt portion of annular form, the bottom edge of said skirt portion being engageable by said annular flat surface portion of the base and a wall of said skirt portion being engageable by said annular guide portion of the base to center said cover over the base and to guide said skirt portion in a circular path upon revolving the cover on the base, said cover having a plurality of projections extending radially outward of said skirt portion and arranged in circumferentially spaced relationship about the cover, said base having a plurality of locking portions extending upwardly and thence radially inwardly of said base adjacent the said peripheral portion of the base, said locking portions being arranged in circumferentially spaced relationship about the base, said projections and locking portions being disposed outwardly of the maximum circumference of said annular flat surface portion of said base, said locking portions each having a ledge portion disposed above the level of said annular flat surface portion and being open from said ledge portion downwardly to below the level of said annular flat surface portion to provide an open space at the level of the annular flat surface portion vertically opposite of said ledge portion, the arrangement and number of the said locking portions corresponding with the arrangement and number of the said projections, the positioning of said cover to locate the said bottom edge of said skirt portion adjacent said annular flat surface portion and said wall of the skirt portion adjacent said annular guide portion and the revolving in one direction of said cover in the circular path provided by said guide portion causing said projections to move in a path outwardly of said annular flat surface portion under the ledge portion and over the open space of said locking portions, respectively, and said cover and base to be interlocked against separation in an axial direction by said projections under said ledge portions and overhanging said open spaces of the respective locking portions.

5. A food container comprising in combination a base, said base having a substantially flat central portion adapted to support food thereon, an annular upright wall portion extending downwardly from said central portion, an annular flat surface portion disposed in a plane lower than the plane of said central portion and arranged radially outward of said wall portion, and an outer wall portion extending downwardly and outwardly from said annular flat surface portion, two or more female locking members carried by said base at locations radially outward of said annular flat surface portion and spaced apart substantially uniformly around the periphery of said base, said female locking members having an overhanging portion disposed above the level of said outer wall portion and spaced upwardly from the plane of said flat annular surface portion and spaced radially outwardly from said upright wall, the radially inward edge of said overhanging portion being disposed in an arc centered on the axis of said base, the arc-shaped edge of each said spaced female locking members and the upright wall defining a curved path between each female locking member and said upright wall and the said wall providing a circular guide around the said base, each said female locking member having a passageway under said overhanging portion, each of said passageways having an open end and a closed end spaced apart in a direction circumferential of said base and also having an open bottom to provide an open space below said overhanging portion at the level of said annular flat surface portion, a cover having a downwardly extending skirt portion, said skirt portion having a circular edge portion adapted to complementarily interfit the annular wall portion and annular flat surface portion of said base and to be positioned within the curved paths between respective said female locking members and said upright wall, two or more male locking members carried by said cover and spaced apart substantially uniformly around the periphery of said cover, the arrangement and number of the male locking members carried by the cover corresponding with the arrangement and number of the female locking members carried by the base, said male locking members projecting radially outward from said cover adjacent said circular edge portion, said male locking members extending radially outward from the maximum circumference of said annular flat surface portion and being adapted to enter the respective passageways of the female locking members from the open end thereof and to abut the closed end thereof and to overhang said open space of the female locking members upon moving the male locking members in one circumferential direction relative to said female locking members, and a handle secured to said cover at the top thereof, the positioning of the circular edge portion of the cover adjacent said annular flat surface of the base and the revolving of the cover in said one circumferential direction by rotating said handle while said cover is directed in said curved paths by said circular guide to move said male locking members and female locking members in interlocked engagement holding the said base and cover held together to be liftable as a unit by said handle.

ALFRED B. STOTTER.

References Cited in the file of this patent

UNITED STATES PATENTS

| Number | Name | Date |
|---|---|---|
| 162,618 | Brodhead | Apr. 27, 1875 |
| 1,595,356 | Moseman | Aug. 10, 1926 |
| 1,600,132 | Pearl | Sept. 14, 1926 |
| 1,767,040 | Bell | June 24, 1930 |
| 1,802,186 | Reid | Apr. 21, 1931 |
| 1,863,793 | Hermani | June 21, 1932 |
| 1,866,126 | Payson | July 5, 1932 |
| 2,034,478 | Levy | Mar. 17, 1936 |
| 2,218,188 | Wittenberg | Oct. 15, 1940 |
| 2,352,684 | Braddock | July 4, 1944 |
| 2,431,905 | Anicetti | Dec. 2, 1947 |

FOREIGN PATENTS

| Number | Country | Date |
|---|---|---|
| 31,579 | Austria | Jan. 25, 1908 |